3,196,708
STEERING WHEEL
Paul R. Weitzman, Portland, Ind., assignor to
Sheller Manufacturing Corporation
Filed Sept. 14, 1962, Ser. No. 223,687
4 Claims. (Cl. 74—552)

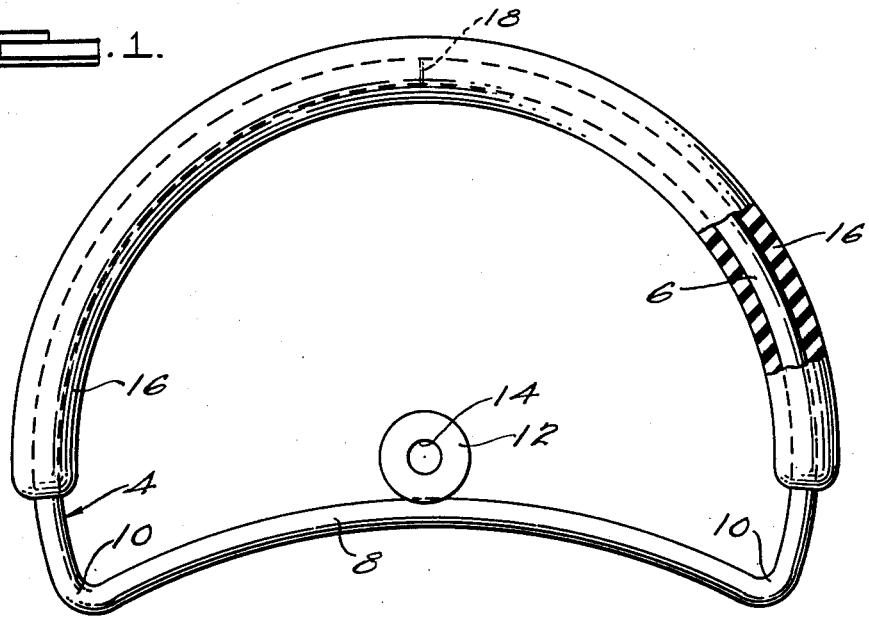
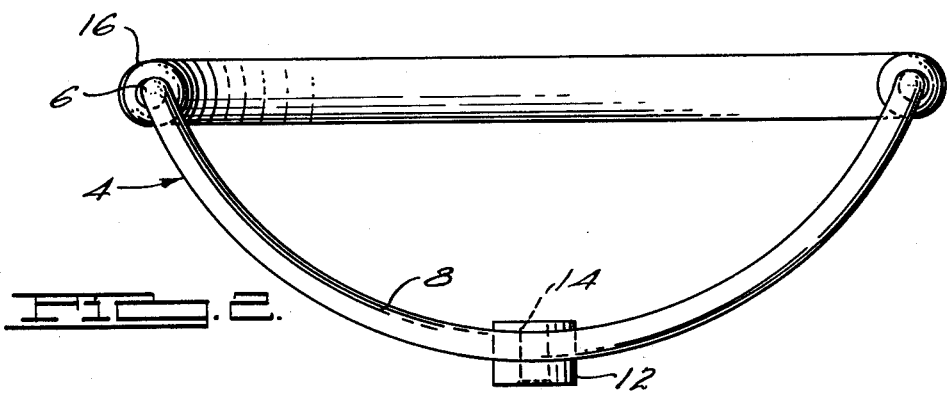
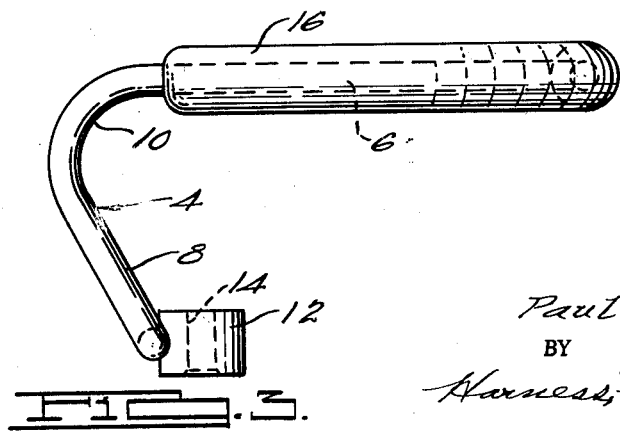

The present invention pertains to a novel steering wheel construction providing improved rigidity and fatigue characteristics and to a method of making the steering wheel requiring fewer forming operations and achieving thereby simplicity and economy in manufacture.

It is conventional in steering wheel constructions of the types heretofore used or proposed for use, to employ a high strength insert such as steel over which a suitable cladding or covering material such as plastic or rubber, for example, is applied to enhance the appearance and gripping characteristics of the wheel. The structural inserts of the types heretofore known conventionally consist of a composite construction comprising a rim and a plurality of spokes which are securely fastened to each other and to a central hub such as by brazing or welding. By virtue of this construction the heating of the metal at the point of juncture such as is encountered in welding, for example, effects a localized annealment of the steel resulting in a substantial reduction in its tensile properties at the points of maximum stress concentration. Moreover, the juncture between the spokes and rim in the inserts heretofore known are relatively abrupt resulting in a high stress concentration at such points, resulting in premature fracture or fatigue failure of the resultant steering wheel. In addition, the composite construction of steering wheels of the foregoing type including a plurality of spokes, a rim, and a hub necessitates a relatively large number of manufacturing operations and complex and expensive jigs and fixtures which substantially increase the cost of the steering wheel.

It is accordingly, a principal object of the present invention to provide an improved integral steering wheel insert and a method of manufacturing the insert which overcomes the problems and disadvantages associated with steering wheel inserts and manufacturing techniques heretofore known.

Another object of the present invention is to provide an improved integral steering wheel insert wherein the rim and spokes are of an integral construction and are connected to each other through a gradual contour minimizing local stress concentrations and substantially increasing the strength, rigidity and fatigue characteristics of the steering wheel.

Still another object of the present invention is to provide an improved method of forming a steering wheel insert which is of an integral construction necessitating a minimal number of manufacturing steps.

A further object of the present invention is to provide an improved integral steering wheel insert and a method of manufacturing the insert which is of high strength, durable operation, and of economical and simple manufacture.

The foregoing and other objects and advantages of the present invention are achieved by a steering wheel insert construction comprising an integral rim and spoke including an arcuate rim portion disposed in one plane and an arcuate spoke portion disposed in a plane angularly inclined relative to the plane of said rim and wherein a hub is securely affixed to said arcuate spoke at substantially the midpoint thereof. The foregoing construction can be simply accomplished by forming a continuous arcuate ring from a rod and buttwelding the ends together followed thereafter by bending an arcuate section of the ring downwardly in a plane angularly disposed with respect to the plane of the balance of said ring forming therewith a spoke segment and a rim segment, respectively, and thereafter securely affixing a hub to substantially the midpoint of said spoke segment.

Other objects, features, and advantages of the present invention will become apparent from the subsequent description, taken in conjunction with the accompanying drawing, wherein:

FIGURE 1 is a plan view partly in section of a steering wheel incorporating therein an integral insert constructed in accordance with the preferred embodiments of the present invention;

FIG. 2 is an end elevation view of the steering wheel shown in FIGURE 1, and

FIG. 3 is a side elevation view of the steering wheel shown in FIGURE 1 and taken at an angle displaced 90° from the end elevation view shown in FIGURE 2.

Referring now in detail to the drawing, a steering wheel incorporating therein the preferred embodiments of the present invention is illustrated and comprises a continuous arcuate ring 4, which is made of a high strength material such as steel, for example. The ring 4 comprises a first arcuate section or rim 6 and a second arcuate section or spoke 8 which are joined to each other by arcuately bent segments 10 which are integral with the ring 4.

In the exemplary embodiment shown, the ring 4 is of a circular configuration of substantially constant radius whereby the first arcuate section 6 and the second arcuate section 8 are of substantially equal curvature. The first arcuate section 6 also comprises the major circumferential section of the ring 4 and the second arcuate section 8 comprises the minor section. The arcuately bent segments 10 are of a gradual radius as opposed to an abrupt sharp bend to minimize the creation of any stress concentration at the point of transition between the first arcuate section and the second arcuate section.

In the exemplary steering wheel shown in the drawing, the first arcuate section or rim 6 is flat and disposed in one plane and the second arcuate section or spoke 8, is also flat and disposed in a plane which is angularly offset with respect to the plane of the first arcuate section. The magnitude of angular offset can vary and is preferably controlled so that the axis of a hub 12 is disposed substantially perpendicular to the plane of the first arcuate section and intersects that plane at substanially the center of the arcuate curvature or the rim 6. By virtue of this specific arrangement, the lever arm or turning force will be substantially constant regardless of the segment of the first arcuate section 6 at which a turning force is applied.

It will be understood, however, that alternate satisfactory steering wheel constructions embodying the principles as hereinabove described and as shown in the drawing, can be achieved by employing a continuous ring which is of an elliptical or other desired arcuate configuration and wherein the second arcuate section or spoke 8 is not flat but is arcuately curved to provide the desired clearance and appearance characteristics. Similarly, the hub 12 may be provided with a suitable flange (not shown) in lieu of a bore 14 extending axially therethrough to enable attachment of the steering wheel to a steering shaft consistent with the particular type of connection desired.

In order to facilitate the gripping of the rim or first arcuate section 6 of the steering wheel, at least a portion of the length thereof is preferably encased in a suitable coating or covering material 16 such as a plastic material or a natural or synthetic rubber material. The covering material 16 may also extend, if desired, downwardly along the spoke portion of the wheel wherein the entire ring 4 is encased therein.

In addition to the improved strength and rigidity characteristics of the construction shown in the drawings, the simplicity of the construction also enables simple and economical manufacture thereof employing a minimal number of processing steps. In the manufacturing operation of the steering wheel, a rod is provided which is formed into a ring and the ends are rigidly affixed to each other such as by buttwelding and ground smooth forming a continuous ring. This operation can conveniently be formed in one step in a ring forming machine. The continuous ring can thereafter be placed in a bending die wherein the arcuate spoke section is angularly offset relative to the rim section. In performing this operation it is preferred that the buttwelded juncture of the continuous ring generally indicated at 18 in FIGURE 1 is disposed along the central portion of the first arcuate section or rim 6 which conventionally is a low stress section of the wheel. After the bending operation, a hub of suitable configuration can be rigidly affixed to substantially the midpoint of the spoke section such as by resistant welding, for example, forming therewith an integral steering wheel insert. If a coating is desired, the integral insert thereafter can be either dipped or placed in a mold for the application of a suitable covering material around selected portions thereof.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. A steering wheel insert comprising a continuous arcuate ring including a first section disposed in a first plane and a second section disposed in a second plane angularly disposed relative to said first plane and connected by arcuately bent integral segments of said ring, and a hub affixed to substantially the midpoint of said second section with its axis disposed substantially perpendicular to said first plane, said first section and said second section substantially symmetrical about a plane passing through said axis and the midpoint of said first section.

2. A steering wheel insert comprising a continuous circular ring of substantially constant radius including a first section disposed in a first plane and a second section disposed in a second plane angularly disposed relative to said first plane and connected by arcuately bent integral segments of said ring, and a hub affixed to substantially the midpoint of said second section and disposed with its axis positioned substantially perpendicular to said first plane.

3. A steering wheel insert comprising a continuous circular ring of substantially constant radius including a first section disposed in a first plane and second section disposed in a second plane angularly disposed relative to said first plane and connected by arcuately bent integral segments of said ring, and a hub affixed to substantially the midpoint of said second section in a position such that the axis of said hub is disposed substantially perpendicular to and intersects said first plane of said first section at substantially the center of the arcuate curvature thereof.

4. A steering wheel comprising a continuous circular ring of substantially constant radius including a first section disposed in a first plane and a second section disposed in a second plane angularly positioned relative to said first plane and connected by arcuately bent integral segments of said ring, a hub affixed to substantially the midpoint of said second section and disposed with its axis substantially perpendicular to and intersecting said first plane at substantially the center of the arcuate curvature of said first section, and a coating around at least a portion of said ring for facilitating the gripping thereof.

References Cited by the Examiner

UNITED STATES PATENTS

| | | | |
|---|---|---|---|
| D. 147,608 | 10/47 | Benzel | 74—552 X |
| 1,130,933 | 3/15 | Rupert | 74—552 X |
| 1,912,088 | 5/33 | Mitchell | 74—552 X |
| 2,408,388 | 10/46 | George | 74—552 |
| 2,491,609 | 12/49 | George | 74—552 |
| 3,064,495 | 11/62 | Quillery | 74—552 |

FOREIGN PATENTS

| | | |
|---|---|---|
| 1,151,080 | 8/57 | France. |
| 266,126 | 2/27 | Great Britain. |

BROUGHTON G. DURHAM, *Primary Examiner.*